(12) United States Patent
Zhang et al.

(10) Patent No.: US 12,446,065 B2
(45) Date of Patent: *Oct. 14, 2025

(54) DATA TRANSMISSION METHOD AND APPARATUS IN WLAN

(71) Applicant: HUAWEI TECHNOLOGIES CO., LTD., Guangdong (CN)

(72) Inventors: Jiayin Zhang, Shanghai (CN); Chixiang Ma, Shanghai (CN); Jun Luo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 137 days.

This patent is subject to a terminal disclaimer.

(21) Appl. No.: 17/971,173

(22) Filed: Oct. 21, 2022

(65) Prior Publication Data

US 2023/0059567 A1    Feb. 23, 2023

Related U.S. Application Data

(63) Continuation of application No. 16/825,597, filed on Mar. 20, 2020, now Pat. No. 11,503,633, which is a
(Continued)

(51) Int. Cl.
*H04W 74/00* (2009.01)
*H04W 74/04* (2009.01)
(Continued)

(52) U.S. Cl.
CPC ......... *H04W 74/006* (2013.01); *H04W 74/04* (2013.01); *H04W 74/0816* (2013.01); *H04W 84/12* (2013.01)

(58) Field of Classification Search
CPC ............... H04W 74/006; H04W 74/04; H04W 74/0816; H04W 84/12; H04W 28/18
See application file for complete search history.

(56) References Cited

U.S. PATENT DOCUMENTS 8,374,074 B2    2/2013   Liao et al.
8,886,755 B1    11/2014  Liu et al.
(Continued)

FOREIGN PATENT DOCUMENTS

CN    102687422 A    9/2012
CN    104488347 A    4/2015
(Continued)

OTHER PUBLICATIONS

Extended European Search Report issued in European Application No. 17738217.3 on Oct. 9, 2018, 7 pages.
(Continued)

*Primary Examiner* — Shawn D Miller
(74) *Attorney, Agent, or Firm* — Fish & Richardson P.C.

(57) ABSTRACT

The present disclosure relates to transmission methods and apparatuses in Wireless Local Area Networks (WLANs). One example method for indicating transmission opportunity (TXOP) duration in a wireless communication system, comprising generating, by a TXOP holder, a physical layer protocol data unit (PPDU), where the High Efficiency Signal field A (HE-SIGA) in the PPDU carries a TXOP duration field, the TXOP duration field is used to indicate the remaining time for using the channel by the station to other stations, the TXOP duration field includes a first part which is used to indicate the granularity used, and a second part which is used to indicate the TXOP duration using the granularity indicated by the first part, and sending the generated PPDU.

15 Claims, 4 Drawing Sheets

Related U.S. Application Data continuation of application No. 16/034,498, filed on Jul. 13, 2018, now Pat. No. 10,750,536, which is a continuation of application No. PCT/CN2017/071258, filed on Jan. 16, 2017.

(60) Provisional application No. 62/363,344, filed on Jul. 18, 2016, provisional application No. 62/278,437, filed on Jan. 14, 2016.

(51) Int. Cl.
*H04W 74/0816* (2024.01)
*H04W 84/12* (2009.01)

(56) References Cited

U.S. PATENT DOCUMENTS

| | | | |
|---|---|---|---|
| 9,369,240 | B2 | 6/2016 | Pirskanen et al. |
| 10,045,340 | B1 | 8/2018 | Chu et al. |
| 2011/0222519 | A1 | 9/2011 | Liao et al. |
| 2012/0188923 | A1 | 7/2012 | Kwon et al. |
| 2012/0250543 | A1 | 10/2012 | Abraham et al. |
| 2013/0294431 | A1 | 11/2013 | Wang |
| 2014/0169357 | A1 | 6/2014 | Noh et al. |
| 2015/0023337 | A1 | 1/2015 | Gong et al. |
| 2015/0181620 | A1 | 6/2015 | Seok |
| 2015/0282043 | A1 | 10/2015 | Fang et al. |
| 2015/0296517 | A1 | 10/2015 | Yu et al. |
| 2016/0165524 | A1 | 6/2016 | Kim et al. |
| 2016/0330764 | A1 | 11/2016 | Kim et al. |
| 2017/0171878 | A1 | 6/2017 | Chun et al. |
| 2017/0201956 | A1* | 7/2017 | Huang ............... H04W 74/006 |
| 2017/0208625 | A1 | 7/2017 | Choi |
| 2018/0359807 | A1* | 12/2018 | Kim ................ H04W 72/0446 |

FOREIGN PATENT DOCUMENTS

| | | |
|---|---|---|
| CN | 104954297 A | 9/2015 |
| CN | 108702654 B | 9/2020 |
| EP | 3297359 A1 | 3/2018 |
| RU | 2546597 C2 | 4/2012 |
| WO | 2015016684 A1 | 2/2015 |
| WO | 2015102228 A1 | 7/2015 |
| WO | 2016003056 A1 | 1/2016 |

OTHER PUBLICATIONS

International Search Report and Written Opinion issued in International Application No. PCT/CN2017/071258 on Mar. 8, 2017, 11 pages.
Li et al., "Non-contiguous Channel Bonding in 11ax," Nov. 6, 2015, 16 pages.
Ma et al., "Further Discussion on Spatial Reuse Operations in 11ax," Dec. 26, 2015, 15 pages.
Office Action issued in Chinese Application No. 201780012403.X on Mar. 17, 2020, 5 pages.
Office Action issued in Indian Application No. 201837026721 on Jun. 22, 2020, 6 pages.
Office Action issued in Russian Application No. 2018129346/08 on May 15, 2019, 15 pages (with English translation).
Perahia et al., "Next Generation Wireless LANs Throughput: Robustness, and Reliability in 802.11n," Cambridge University Press, Nov. 2008, t416 pages.
Search Report issued in Russian Application No. 2018129346/08 on May 8, 2019, 4 pages (with English translation).
Stacey et al., "Extra tones in the preamble," IEEE 802.11-15/1357r1, Nov. 2015, 16 pages.
Zhang (Huawei), "HE-SIG-A Content; 11-15-1077-00-00ax-he-sig-a-content," vol. 802.11 ax, Sep. 14, 2015, pp. 1-21, XP068098290.

\* cited by examiner

DATA TRANSMISSION METHOD AND APPARATUS IN WLAN

CROSS-REFERENCE TO RELATED APPLICATIONS

This application is a continuation of U.S. patent application Ser. No. 16/825,597, filed on Mar. 20, 2020, which is a continuation of U.S. patent application Ser. No. 16/034,498, filed on Jul. 13, 2018, now U.S. Pat. No. 10,750,536, which is a continuation of International Application No. PCT/CN2017/071258, filed on Jan. 16, 2017, which claims priority to U.S. Provisional Application No. 62/278,437, filed on Jan. 14, 2016 and priority to U.S. Provisional Application No. 62/363,344, filed on Jul. 18, 2016. All of the afore-mentioned patent applications are hereby incorporated by reference in their entireties.

DEFINITION OF ABBREVIATIONS

HE: high efficiency
HE-SIGA: High Efficiency Signal field A
SU: single user
MU: multiple user
PPDU: physical layer protocol data unit
PHY: physical layer
MAC: medium access control layer
EDCA: enhanced distributed channel access
QoS: quality of service
SR: spatial reuse
DL: downlink
UL: uplink
NAV: network allocation vector
ACK: acknowledge
LGI: long guard interval
STF: short training field
LTF: long training field
SIG: signal field
RTS: request to send
L-SIG: non-HT signal field
L-STF: non-HT short training field
L-LTF: non-HT long training field
RL-SIG: repeated non-HT signal field
SIFS: short interframe space
TXOP: transmission opportunity
SS: simulation scenario
SLS: system level simulation
CF: contention free
CF-Poll: contention free poll
CF-END: contention free end

FIELD OF THE INVENTION

The present invention relates to the field of communications technologies, and more specifically, to a method for transceiving in a WLAN and an apparatus.

BACKGROUND OF THE INVENTION

Wireless Local Area Networks (WLAN) is a data transmission system. It uses radio frequency (RF) technology to replace the old twisted-pair copper wire formed by the local area network, making the wireless local area network able to use a simple access architecture that allows users through it, to achieve the purpose of information transmission. The development and application of WLAN technology has deeply changed people's communication way and working way, and brought people unprecedented convenience. With the wide application of intelligent terminals, the demand for data network traffic is increasing day by day.

WLAN development is inseparable from the development and application of its standards, including IEEE802.11 series being the main standard that includes 802.11, 802.11b/g/a, 802.11n, 802.11ac. Except for 802.11 and 802.11b, other standards use Orthogonal Frequency Division Multiplexing (OFDM) technology as the physical layer of the core technology.

SUMMARY OF THE INVENTION

In 802.11ax, the field of transmission opportunity (TXOP) duration was included in HE-SIGA of SU PPDU, DL MU PPDU or UL MU PPDU, in order to replace the Duration in MAC header in former standards. However the number of bit is still to be determined (TBD).

The TXOP duration is the time remaining for a station (STA) to use a channel. For example, an STA sends a packet of 1 ms, which is not counted in the remaining time of using the channel by the STA, because the 1 ms has already been used. TXOP duration indicates the remaining time during which a channel is available for using by the station, such as 3 ms. There is a limit to the value of the remaining time.

Duration field in a MAC header has 16 bits (15 valid bits) in the units of 1 μs. It can indicate the maximum time duration of 32.767 ms.

In this application, we further discuss a solution which increases the efficiency of the indication of TXOP duration. In the method, the station generates a PPDU, which carries a TXOP field (TXOP duration) in the HE-SIGA of the PPDU, which is used for notifying the other station of the remaining time of using the channel by the station, wherein the TXOP field can be indicated in different granularities (units). The PPDU is sent by the station. In an example, the TXOP field occupies 7 bits, being indicated by two different granularities. For example, the two different granularities include 8 μs and 256 μs.

DESCRIPTION OF EMBODIMENTS

TXOP Limits in EDCA
AP can set the policy of channel access with the EDCA Parameter Set element, where a TXOP limit is defined.
A TXOP limit has 16 bits in the unit of 32 μs. The default EDCA parameter of TXOP for each access category is as Table 1:

TABLE 1

| AC | CWmin | CWmax | AIFSN | TXOP limit For PHYs defined in Clause 16 and Clause 17 | For PHYs defined in Clause 18, Clause 19, Clause 20, and Clause 22 | Other PHYs |
|---|---|---|---|---|---|---|
| AC_BK | aCWmin | aCWmax | 7 | 0 | 0 | 0 |
| AC_BE | aCWmin | aCWmax | 3 | 0 | 0 | 0 |
| AC_VI | (aCWmin + 1)/2 − 1 | aCWmin | 2 | 6.016 ms | 3.008 ms | 0 |
| AC_VO | (aCWmin + 1)/4 − 1 | (aCWmin − 1)/2 − 1 | 2 | 3.264 ms | 1.504 ms | 0 |

An STA can also be granted a TXOP with QoS data frames of subtypes that include CF-Poll.

The time duration of the TXOP is carried in the 8-bit TXOP limit subfield of QoS field in MAC header. The range of time values is 32 µs to 8160 µs.

There are also different regulations for TXOP in different countries, such as 4 ms in Japan.

It is provided that 4.08 ms~16.32 ms is a reasonable range for TXOP limit for 802.11ax considering the efficiency and fairness among different BSS in the dense environment.

16.32 ms can support at least one pair of DL and UL PPDU in a cascading structure.

TXOP Unit

The smaller TXOP unit costs a large number of bits in HE-SIGA.

There are only 13 or 14 bits in total left in the HE-SIGA of SU PPDU or DL MU PPDU.

Around 7~9 bits can be used for TXOP duration considering the field of spatial reuse and other potential new fields, e.g. non-contiguous channel bonding.

3~4 bits for SR.

2 bits for non contiguous channel bonding in DL MU PPDU.

The larger TXOP unit cost performance degradation due to NAV extension at 3rd party STA.

Figure 1:
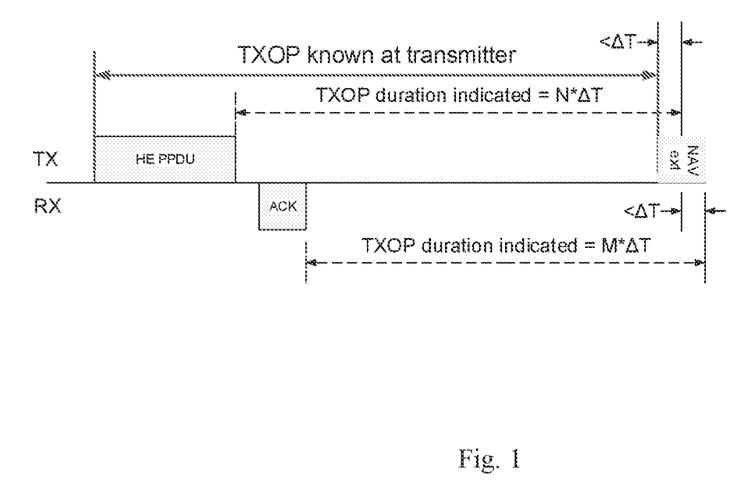
FIG. 1 illustrates an embodiment of indication of TXOP duration.

As shown in FIG. 1 (SLS evaluation), we observed that the NAV extension will not exceed 2 times of the TXOP unit, no matter the length of TXOP and how many packet exchanged within the TXOP.

IEEE SS2 (can be seen in TGax simulation scenarios document (11-14-0980)), 32 BSSs; ~64 STAs/BSS (totally 2048 STAs in 32 BSSs, that is, about 64 STAs per BSS); Frequency Reuse factor=4;

20 MHz @ 5 GHz (in 5 GHz unlicensed band, the bandwidth is 20 MHz); 2 T×2 R, wherein the T is short for Transmission antenna number, the R is short for Receiving antenna number.

Full buffer, 2 ms TXOP, RTS off.

CF-END Off

TABLE 2

| Unit (µs) | Throughput (Mbps) | Loss |
|---|---|---|
| 1024 | 247.648 | 49.99% |
| 512 | 331.483 | 33.05% |
| 256 | 394.352 | 20.36% |
| 128 | 439.931 | 11.15% |
| 64 | 466.632 | 5.76% |
| 32 | 481.309 | 2.80% |
| 16 | 489.537 | 1.13% |
| 1 (original) | 495.153 | 0.00% |

CF-END On

TABLE 3

| unit (µs) | Throughput (Mbps) | Loss |
|---|---|---|
| 1024 | 464.871 | 6.08% |
| 512 | 466.109 | 5.83% |
| 256 | 465.743 | 5.91% |
| 128 | 464.396 | 6.18% |
| 64 | 465.582 | 5.94% |
| 32 | 479.736 | 3.08% |
| 16 | 488.327 | 1.34% |
| 1 (original) | 494.983 | 0.00% |

Considering the current numerology in 802.11ax, 4 µs~32 µs is suitable for the minimum TXOP unit.

Maximum symbol duration of 16 µs Data symbol+LGI.

Maximum symbol duration of 8 µs for HE-STF, 16 µs for HE-LTF+LGI.

32 µs fixed preamble overhead of 802.11ax. PPDU (L-STF+L-LTF+L-SIG+RL-SIG+HE-SIGA).

Multi-Level TXOP Indication

Smaller TXOP unit for shorter TXOP, larger unit for longer TXOP, in order to keep the similar relative loss.

E.g. 4 µs TXOP unit for TXOP length shorter than 128 µs, while 256 µs TXOP unit for TXOP length larger than 896 µs.

The NAV extension can be alleviated by sending CF-end if the remaining time is larger than 68 µs (CF-END+SIFS).

In this application, a method to indicate TXOP duration in HE-SIGA is disclosed.

In order to achieve tradeoff between performance and overhead, 6 or 7 bits are used with multi-level indication.

Example 1 (Opt 1) Shown in Table 4

7 bits in total 2 bits indicate the TXOP unit: 4 µs/8 µs/16 µs/256 µs.

TABLE 4

| B1B2 | B3~B7 | TXOP range | Unit |
|---|---|---|---|
| 00 | 00000~11111 | 0 µs~124 µs | 4 µs |
| 01 | 00000~11111 | 128 µs~376 µs | 8 µs |
| 10 | 00000~11111 | 384 µs~880 µs | 16 µs |
| 11 | 00000~11111 | 896 µs~8832 µs | 256 µs |

Example 2 (Opt 2) Shown in Table 5

7 bits in total, wherein 2 bits indicate the TXOP unit: 8 µs/16 µs/32 µs/512 µs.

TABLE 5

| B1B2 | B3~B7 | TXOP range | Unit |
| --- | --- | --- | --- |
| 00 | 00000~11111 | 0 μs~248 μs | 8 μs |
| 01 | 00000~11111 | 256 μs~752 μs | 16 μs |
| 10 | 00000~11111 | 768 μs~1760 μs | 32 μs |
| 11 | 00000~11111 | 1792 μs~17664 μs | 512 μs |

Simplified Solutions

Example 3 (Opt 3), Shown in Table 6

6 bits in total, wherein 1 bit indicate the TXOP unit: 16 μs/512 μs.

TABLE 6

| B1 | B2~B6 | TXOP range | Unit |
| --- | --- | --- | --- |
| 0 | 00000~11111 | 0 μs~496 μs | 16 μs |
| 1 | 00000~11111 | 512 μs~16384 μs | 512 μs |

Figure 2:
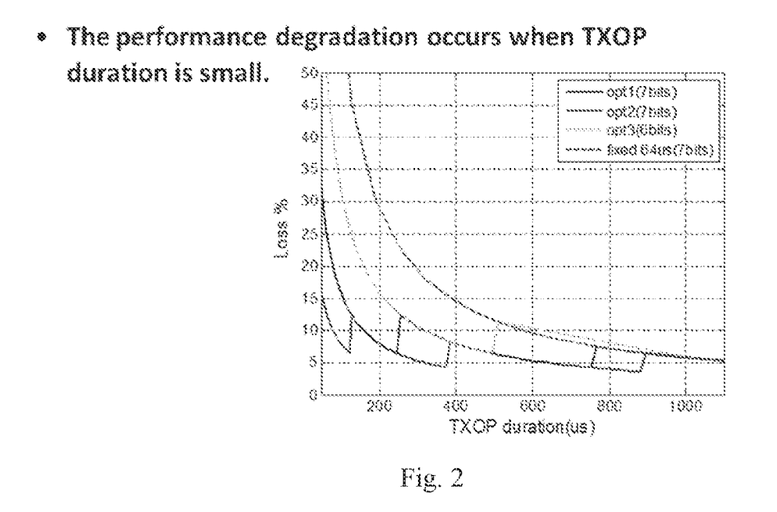
FIG. 2 illustrates the performance degradation of the opt1, 2, 3 and fixed 64 μs.

FIG. 2 Shows the Comparison of the Performance of the Former Three Examples (Opt):

Another Example of 6 Bits in Total, Shown in Table 7

Wherein 2 bits indicate the TXOP unit: 8 μs/16 μs/32 μs/512 μs.

TABLE 7

| B1B2 | B3~B6 | TXOP range | Unit |
| --- | --- | --- | --- |
| 00 | 0000~1111 | 0 μs~120 μs | 8 μs |
| 01 | 0000~1111 | 128 μs~368 μs | 16 μs |
| 10 | 0000~1111 | 384 μs~864 μs | 32 μs |
| 11 | 0000~1111 | 896 μs~8576 μs | 512 μs |

Another Example of 6 Bits in Total, Shown in Table 8

Wherein 2 bits indicate the TXOP unit: 16 μs/16 μs/32 μs/512 μs.

TABLE 8

| B1B2 | B3~B6 | TXOP range | Unit |
| --- | --- | --- | --- |
| 00 | 0000~1111 | 0 μs~240 μs | 16 μs |
| 01 | 0000~1111 | 256 μs~496 μs | 16 μs |
| 10 | 0000~1111 | 512 μs~992 μs | 32 μs |
| 11 | 0000~1111 | 1024 μs~8704 μs | 512 μs |

Another Example of 6 Bits in Total, Shown in Table 9

Wherein 2 bits indicate the TXOP unit: 16 μs/16 μs/16 μs/512 μs.

TABLE 9

| B1B2 | B3~B6 | TXOP range | Unit |
| --- | --- | --- | --- |
| 00 | 0000~1111 | 0 μs~240 μs | 16 μs |
| 01 | 0000~1111 | 256 μs~496 μs | 16 μs |
| 10 | 0000~1111 | 512 μs~752 μs | 16 μs |
| 11 | 0000~1111 | 768 μs~8448 μs | 512 μs |

Example 4, Shown in Table 10

Fixed 64 μs granularity with 7 bit in total.

TABLE 10

| B1~B7 | TXOP range | Unit |
| --- | --- | --- |
| 0000000~1111111 | 0 μs~8128 μs | 64 μs |

Example 5, Shown in Table 11

7 bits in total
2 bits indicate the TXOP unit: 4 μs/16 μs/64 μs/256 μs.

TABLE 11

| B1B2 | B3~B7 | TXOP range | Unit |
| --- | --- | --- | --- |
| 00 | 00000~11111 | 0 μs~124 μs | 4 μs |
| 01 | 00000~11111 | 128 μs~624 μs | 16 μs |
| 10 | 00000~11111 | 640 μs~2624 μs | 64 μs |
| 11 | 00000~11111 | 2688 μs~10624 μs | 256 μs |

Example 6, Shown in Table 12

7 bits in total
2 bits indicate the TXOP unit: 8 μs/16 μs/32 μs/256 μs.

TABLE 12

| B1B2 | B3~B7 | TXOP range | Unit |
| --- | --- | --- | --- |
| 00 | 00000~11111 | 0 μs~248 μs | 8 μs |
| 01 | 00000~11111 | 256 μs~752 μs | 16 μs |
| 10 | 00000~11111 | 768 μs~1760 μs | 32 μs |
| 11 | 00000~11111 | 1792 μs~9728 μs | 256 μs |

Example 7, Shown in Table 13

7 bits in total
2 bits indicate the TXOP unit: 8 μs/16 μs/64 μs/256 μs.

TABLE 13

| B1B2 | B3~B7 | TXOP range | Unit |
| --- | --- | --- | --- |
| 00 | 00000~11111 | 0 μs~248 μs | 8 μs |
| 01 | 00000~11111 | 256 μs~752 μs | 16 μs |
| 10 | 00000~11111 | 768 μs~2752 μs | 64 μs |
| 11 | 00000~11111 | 2816 μs~10752 μs | 256 μs |

Example 8, Shown in Table 14

7 bits in total
2 bits indicate the TXOP unit: 8 μs/16 μs/64 μs/512 μs.

TABLE 14

| B1B2 | B3~B7 | TXOP range | Unit |
|---|---|---|---|
| 00 | 00000~11111 | 0 μs~248 μs | 8 μs |
| 01 | 00000~11111 | 256 μs~752 μs | 16 μs |
| 10 | 00000~11111 | 768 μs~2752 μs | 64 μs |
| 11 | 00000~11111 | 2816 μs~18688 μs | 512 μs |

Example 9, Shown in Table 15

7 bits in total 2 bits indicate the TXOP unit: 8 μs/32 μs/128 μs/512 μs.

TABLE 15

| B1B2 | B3~B7 | TXOP range | Unit |
|---|---|---|---|
| 00 | 00000~11111 | 0 μs~248 μs | 8 μs |
| 01 | 00000~11111 | 256 μs~1248 μs | 32 μs |
| 10 | 00000~11111 | 1280 μs~5248 μs | 128 μs |
| 11 | 00000~11111 | 5376 μs~21248 μs | 512 μs |

Example 10, Shown in Table 16

7 bits in total 2 bits indicate the TXOP unit: 8 μs/32 μs/64 μs/512 μs.

TABLE 16

| B1B2 | B3~B7 | TXOP range | Unit |
|---|---|---|---|
| 00 | 00000~11111 | 0 μs~248 μs | 8 μs |
| 01 | 00000~11111 | 256 μs~1248 μs | 32 μs |
| 10 | 00000~11111 | 1280 μs~3264 μs | 64 μs |
| 11 | 00000~11111 | 3328 μs~19200 μs | 512 μs |

Example 11, Shown in Table 17

7 bits in total 2 bits indicate the TXOP unit: 8 μs/8 μs/8 μs/256 μs.

TABLE 17

| B1B2 | B3~B7 | TXOP range | Unit |
|---|---|---|---|
| 00 | 00000~11111 | 0 μs~248 μs | 8 μs |
| 01 | 00000~11111 | 256 μs~504 μs | 8 μs |
| 10 | 00000~11111 | 512 μs~760 μs | 8 μs |
| 11 | 00000~11111 | 768 μs~8704 μs | 256 μs |

TXOP Duration for ACK/BA/MBA

Figure 3:
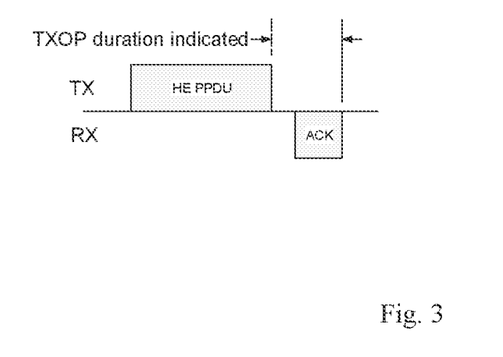
FIG. 3 illustrates an embodiment of indication of TXOP duration.

The TXOP duration field in HE-SIGA can also indicate the time duration for the ACK/BA/MBA immediately following the data PPDU. Shown in FIG. 3.

We can use 7 bits to indicate 1 ms with the unit of 8 μs, which can cover most of the ACK/BA/MBA frames with low MCS.

TABLE 18

| B1~B7 | TXOP range | Unit |
|---|---|---|
| 0000000~1111111 | 0 μs~1016 μs | 8 μs |

Or, in another example,

TABLE 19

| B1~B7 | TXOP range | Unit |
|---|---|---|
| 0000000~1111111 | 0 μs~2032 μs | 16 μs |

Example 12

As shown in Table 20, example 12 is has been disclosed by example 11, which excludes the entry 11111 in Table 17. TXOP in HE-SIGA can use 7 bits with 2 granularities, one is small and one is large granularity. For example, small granularity uses 8 μs to indicate the TXOP range from 0~760 μs with 96 entries, and large granularity uses 256 μs to indicate the TXOP range from 768~8448 μs with 31 entries.

2 bits indicate the TXOP unit: 8 μs/8 μs/8 μs/256 μs.

TABLE 20

| B1B2 | B3~B7 | TXOP range | Unit |
|---|---|---|---|
| 00 | 00000~11111 | 0 μs~248 μs | 8 μs |
| 01 | 00000~11111 | 256 μs~504 μs | 8 μs |
| 10 | 00000~11111 | 512 μs~760 μs | 8 μs |
| 11 | 00000~11110 | 768 μs~8448 μs | 256 μs |

Figure 4:
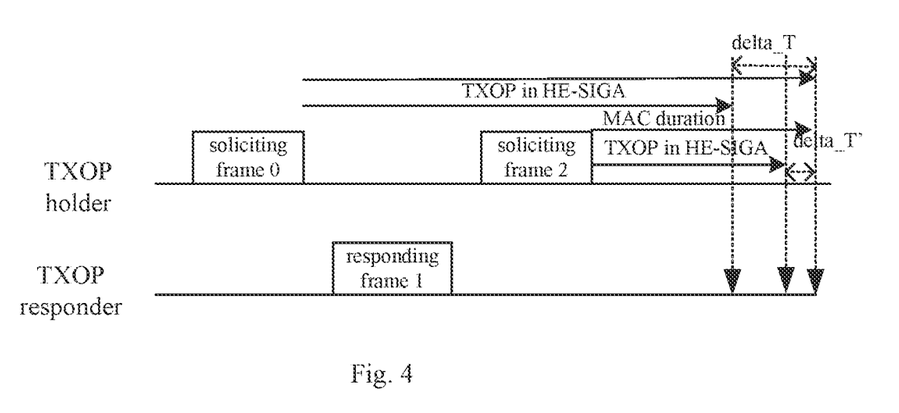
FIG. 4 illustrates an embodiment of indication of TXOP duration.

As the duration field in MAC header is in 1 us unit, there will be accuracy difference between duration in MAC header and TXOP in HE-SIGA. To avoid the over-protection issue that TXOP in HE-SIGA is large than duration in MAC header, the valid duration information indicated by the TXOP field in HE-SIGA shall be the largest feasible duration information that is smaller than or equal to the duration information indicated by the Duration field in a MAC header in the HE PPDU. Then TXOP in HE-SIGA is always less than the exact duration in MAC header with a delta_T, shown in FIG. 4, which relies on the granularity used. This cause a under-protection issue that TXOP in HE-SIGA can't cover the exact duration in MAC header.

Figure 5:
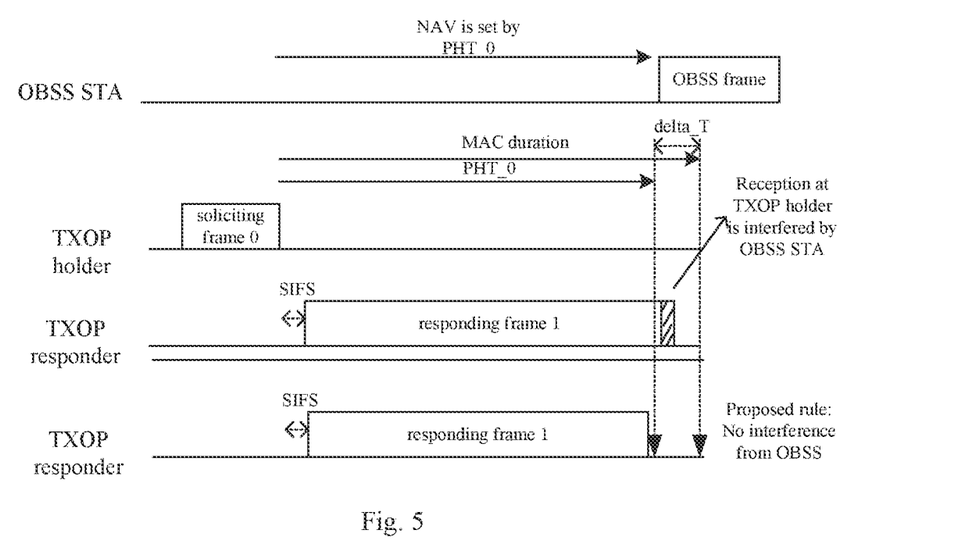
FIG. 5 illustrates an embodiment of indication of TXOP duration.

To avoid the under-protection issue, we add the following rules:

(1) Assuming TXOP holder sends a soliciting frame (e.g. frame 0) with TXOP in HE-SIGA to be the value PHT_0. TXOP responder should transmit a responding frame (e.g. frame 1) no longer than PHT_0-SIFS_time, to avoid that the reception of responding frame at TXOP holder is interfered by OBSS STA which only decodes TXOP field in soliciting frame from TXOP holder and set NAV with PHT_0. Show in FIG. 5.

Figure 6:
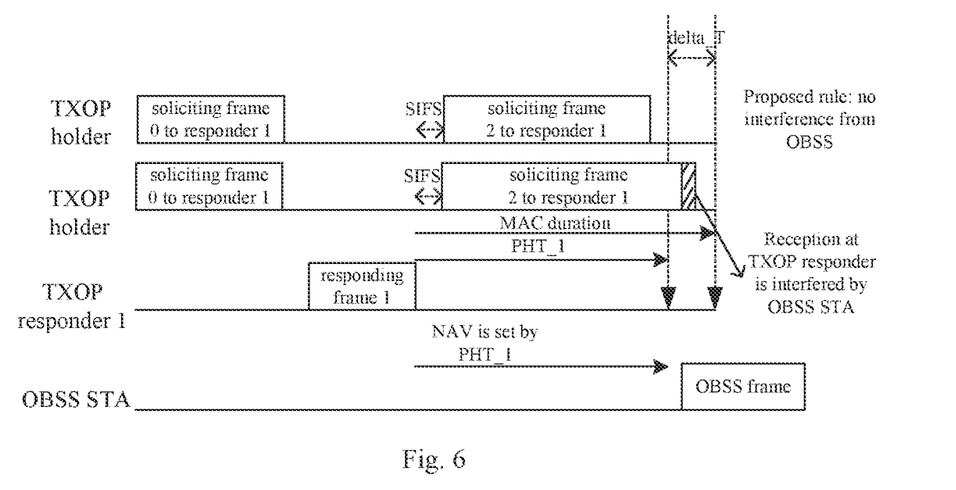
FIG. 6 illustrates an embodiment of indication of TXOP duration.

(2) Assuming TXOP holder receives a responding frame from TXOP responder with TXOP in HE-SIGA to be the value PHT_1. If TXOP holder transmits to the same TXOP responder, it should transmit another soliciting frame (e.g. frame 2) no longer than PHT_1-SIFS_time, to avoid that the reception of the soliciting frame (frame 2) at TXOP responder is interfered by OBSS STA which only decodes TXOP field in responding frame from TXOP responder and set NAV with PHT1. Shown in FIG. 6.

Note: These two rules apply to all examples for TXOP encoding tables above.

Figure 7:
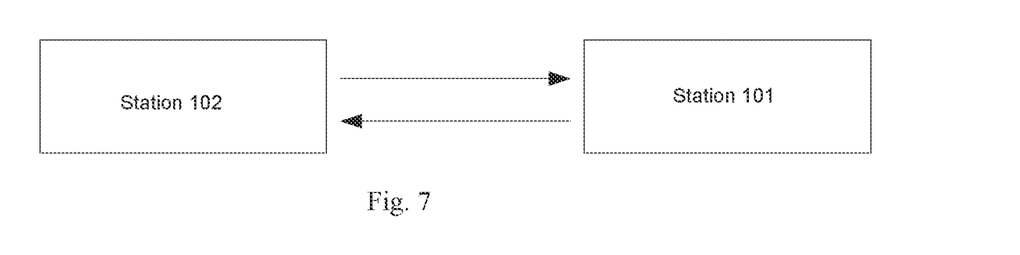
FIG. 7 illustrates a system of indication of TXOP duration.

The scheme of the embodiments is applicable to a WLAN network system. The following is a schematic diagram of an applicable scenario of the method in a wireless local area network provided by embodiments. As shown in FIG. 7 below, the WLAN network system may include an access station 101 and at least a station 102. In the WLAN network system, some stations (non-AP station or AP) may work as a TXOP holder, others may work as a responder, like shown in FIG. 4, 5, or 6.

An access point (AP, Access Point) may also be referred to as a wireless access point, a bridge, a hotspot, or the like, and may be an access server or a communications network.

A station (STA, Station) may be further referred to as a user, and may be a wireless sensor, a wireless communications terminal, or a mobile terminal, for example, a mobile telephone (or referred to as a "cellular" phone) that supports a WiFi communication function and a computer that has a wireless communication function. For example, the station may be a portable, pocket-sized, handheld, computer built-in, wearable, or in-vehicle wireless communications apparatus that supports the WiFi communication function, and exchanges communication data such as voice and data with a wireless access network.

A person skilled in the art knows, some communication equipment may include the both functions of the above STA and AP. It's not limited in the embodiments.

Figure 8:
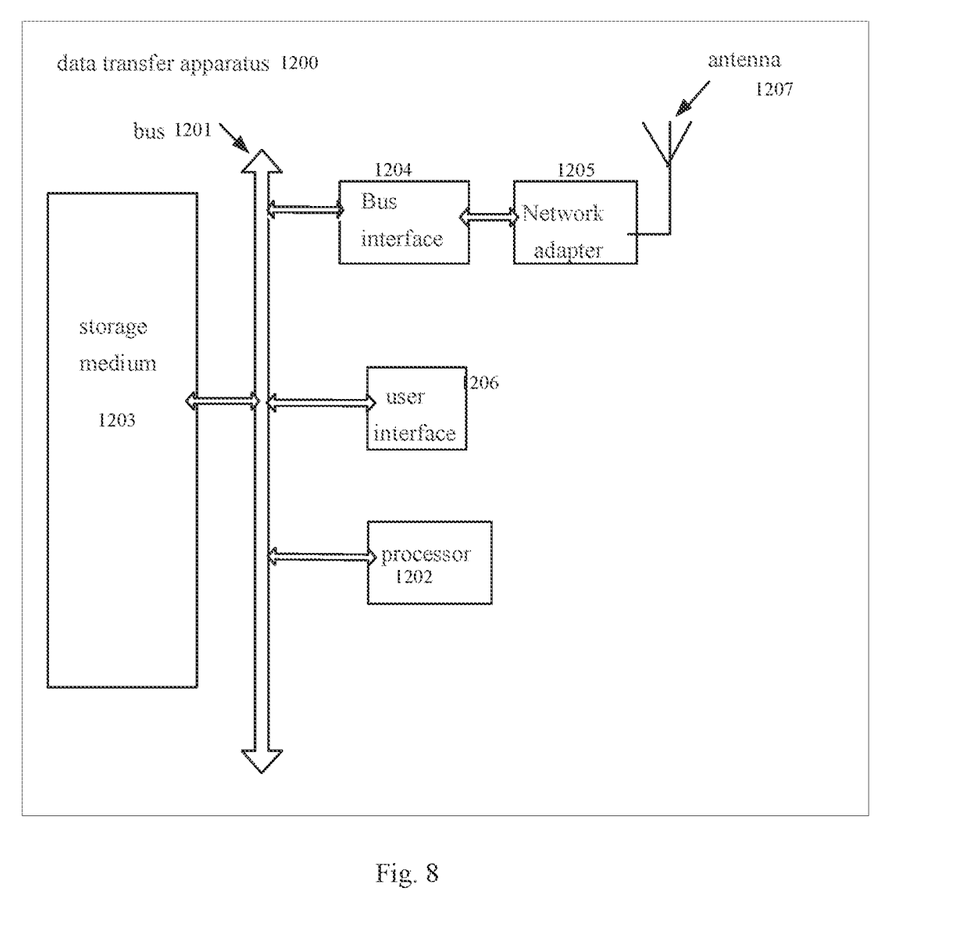
FIG. 8 illustrates an apparatus of indication of TXOP duration.

FIG. 8 is a schematic diagram of a data transmission apparatus (such as an access point, a station, a chip, or the like) provided in the embodiments. As shown in FIG. 8 below, the data transfer apparatus 1200 may be implemented as general bus architecture for the bus 1201. Depending on the particular application of the data transfer apparatus 1200 and the overall design constraints, the bus 1201 may include any number of interconnect buses and bridges. The bus 1201 couples various circuits, including a processor 1202, storage medium 1203, and a bus interface 1204. The bus 1201, the data transfer apparatus 1200 uses the bus interface 1204 to connect the network adapter 1205 and the like via the bus 1201. As shown in FIG. The network adapter 1205 may be used to implement the signal processing functions of the physical layer in the wireless local area network and transmit and receive the radio frequency signals via the antenna 1207. The user interface 1206 may connect a user terminal, such as a keyboard, a display, a mouse, a joystick, or the like. The bus 1201 may also be connected to various other circuits such as timing sources, peripherals, voltage regulators, power management circuits, etc., which are well known in the art and will not be described in detail.

The data transfer apparatus 1200 may also be configured as a general processing system that includes one or more microprocessors that provide processor functionality, and an external memory that provides at least a portion of the storage medium 1203, all of which are communicated via an external bus system The structure is connected with other supporting circuits.

Alternatively, the data transfer apparatus 1200 may be implemented using an ASIC (application-specific integrated circuit) having a processor 1202, a bus interface 1204, a user interface 1206, and at least a portion of a storage medium 1203 integrated in a single chip, or the data transfer apparatus 1200 may be implemented using one or more of an FPGA (Field Programmable Gate Array), a PLD (Programmable Logic Device), a controller, a state machine, gate logic, discrete hardware components, any other suitable Circuits, or any combination of circuits capable of performing the various functions described throughout this disclosure.

The processor 1202 is responsible for managing the bus and general processing (including executing the software stored on the storage medium 1203). The processor 1202 may be implemented using one or more general purpose processors and/or dedicated processors. Examples of processors include microprocessors, microcontrollers, DSP processors, and other circuits capable of executing software. Software should be broadly construed to mean instructions, data, or any combination thereof, whether referred to as software, firmware, middleware, microcode, hardware description language, or otherwise. The storage medium 1203 is shown as being separate from the processor 1202, however, it will be readily apparent to those skilled in the art that the storage medium 1203 or any portion thereof may be located outside of the data transfer apparatus 1200. For example, the storage medium 1203 may include a transmission line, a carrier waveform modulated with data, and/or a computer article separated from the wireless node, all of which may be accessed by the processor 1202 via the bus interface 1204. Alternatively, the storage medium 1203 or any portion thereof may be integrated into the processor 1202, which may be, for example, a cache and/or general purpose register.

The processor 1202 may perform the above-described embodiments, and will not be described herein.

It will be appreciated by those of ordinary skill in the art that all or part of the steps of implementing the method embodiments described above may be accomplished by program related hardware which may be stored in a computer-readable storage medium which, when executed, including the steps of the above-described method embodiment, and the aforementioned storage medium includes various kinds of media, such as a ROM, a RAM, a magnetic disk, or an optical disk, on which program codes can be stored.

The embodiments can be applied to wireless local area networks, including, but not limited to, Wi-Fi systems represented by 802.11a, 802.11b, 802.11g, 802.11n, and 802.11ac and also to next-generation Wi-Fi systems, Wireless LAN systems.

Of course, it may be applied to other possible wireless networks.

The following provides a number of embodiments provided by a simple language description:

An information transmission method for radio communication,
generating, by a sending site, a PPDU carrying a TXOP field in the HE-SIGA of the PPDU, the TXOP field is used for notifying the other stations of the remaining time of the station usage channel, wherein the TXOP field can be indicated by different granularity;
sending the PPDU.

An information receiving method for radio communication,
receiving, a PPDU sent by a sending site, the HEOPA of the PPDU carrying a TXOP field for informing other stations of the remaining time of the station usage channel, wherein the TXOP field may be carried out at different granularity Instructions;
sending, a TXOP response frame according to the received PPDU.

The method according to embodiment 1 or 2, the TXOP field is indicated using two different granularity.

The method of embodiment 3, the TXOP field is indicated by two granularities of 8 µs and 256 µs.

The method of embodiment 4, wherein the TXOP field is 7 bits in length and includes 128 values; wherein 96 values are indicated by a granularity of 8 µs, the indicated TXOP range is 0 to 760 microseconds; 31 The number is indicated with a granularity of 256 µs and the indicated TXOP range is 768 to 8448 µs.

The method according to embodiment 2, further comprising:
the TXOP length of the TXOP response frame should be less than or equal to the length remaining after subtracting the SIFS time from the value represented by the TXOP field in the initiation frame of the station (TXOP origination station).

The method of embodiment 1, wherein the station sends a new TXOP initiation frame if the destination address of the new TXOP transmit frame matches the transmit address of the station that sent the previous TXOP response frame, the new TXOP transmission frame should be less than or equal to the length remaining after the SIFS time minus the value represented by the TXOP field in the TXOP response frame.

The method of embodiment 2, after receiving a PPDU sent by the sending site, replies to an ACK or BA, the ACK or BA comprising a duration field in the granularity representation, the duration field being represented by The time at which the other stations will be notified of the channel to be used.

A communication device comprising a memory and a processor, operable to perform methods such as 1, 3-5, 7.

A communication device comprising a memory and a processor, operable to perform methods such as 2, 3-5, 8.

What is claimed is:

1. A communication apparatus, comprising at least one processor and a computer-readable storage medium, wherein the storage medium stores instructions, and wherein the instructions, when executed by the at least one processor, cause the communication apparatus to:
   receive a physical layer protocol data unit (PPDU) from a transmission opportunity (TXOP) holder, wherein the PPDU comprises a TXOP duration field, wherein the TXOP duration field consists of 7 bits, wherein the TXOP duration field indicates remaining time for using a channel by the TXOP holder, wherein the TXOP duration field comprises a first part which indicates a granularity, and a second part which indicates the remaining time using the granularity, wherein a first value of the first part indicates a first granularity, wherein a second value of the first part indicates a second granularity, wherein the first granularity is 8 µs, and wherein the second granularity is 128 µs; and
   obtain a TXOP duration according to the TXOP duration field.

2. The communication apparatus according to claim 1, wherein the first part of the TXOP duration field is 1 bit.

3. The communication apparatus according to claim 1, wherein the first part of the TXOP duration field is 2 bits.

4. The communication apparatus according to claim 1, wherein the instructions, when executed by the at least one processor, further cause the communication apparatus to:
   send a responding frame, wherein a length of the responding frame is less than or equal to a length remaining after subtracting short interframe space (SIFS) time from the remaining time indicated by the TXOP duration field.

5. The communication apparatus according to claim 1, wherein the communication apparatus is a station.

6. A non-transitory computer-readable storage medium, wherein the non-transitory computer-readable storage medium stores instructions which, when executed by at least one processor of an apparatus, cause the apparatus to:
   receive a physical layer protocol data unit (PPDU) from a transmission opportunity (TXOP) holder, wherein the PPDU comprises a TXOP duration field, wherein the TXOP duration field consists of 7 bits, wherein the TXOP duration field indicates remaining time for using a channel by the TXOP holder, wherein the TXOP duration field comprises a first part which indicates a granularity, and a second part which indicates the remaining time using the granularity, wherein a first value of the first part indicates a first granularity, wherein a second value of the first part indicates a second granularity, wherein the first granularity is 8 µs, and wherein the second granularity is 128 µs; and
   obtain a TXOP duration according to the TXOP duration field.

7. The non-transitory computer-readable storage medium according to claim 6, wherein the first part of the TXOP duration field is 1 bit.

8. The non-transitory computer-readable storage medium according to claim 6, wherein the first part of the TXOP duration field is 2 bits.

9. The non-transitory computer-readable storage medium according to claim 6, wherein the instructions, when executed by the at least one processor, further cause the apparatus to:
   send a responding frame, wherein a length of the responding frame is less than or equal to a length remaining after subtracting short interframe space (SIFS) time from the remaining time indicated by the TXOP duration field.

10. A chip, comprising at least one processor and a non-transitory computer-readable storage medium, wherein the storage medium stores instructions, and wherein the instructions, when executed by the at least one processor, cause an apparatus comprising the chip to:
    receive a physical layer protocol data unit (PPDU) from a transmission opportunity (TXOP) holder, wherein the PPDU comprises a TXOP duration field, wherein the TXOP duration field consists of 7 bits, wherein the TXOP duration field indicates remaining time for using a channel by the TXOP holder, wherein the TXOP duration field comprises a first part which indicates a granularity, and a second part which indicates the remaining time using the granularity, wherein a first value of the first part indicates a first granularity, wherein a second value of the first part indicates a second granularity, wherein the first granularity is 8 µs, and wherein the second granularity is 128 µs; and
    obtain a TXOP duration according to the TXOP duration field.

11. The chip according to the claim 10, wherein the first part of the TXOP duration field is 1 bit.

12. The chip according to the claim 10, wherein the first part of the TXOP duration field is 2 bits.

13. The chip according to claim 10, wherein the instructions, when executed by the at least one processor, further cause the apparatus comprising the chip to:
    send a responding frame, wherein a length of the responding frame is less than or equal to a length remaining after subtracting short interframe space (SIFS) time from the remaining time indicated by the TXOP duration field.

14. The non-transitory computer-readable storage medium according to claim 6, wherein the apparatus is a station.

15. The chip according to claim 10, wherein the apparatus is a station.

* * * * *